United States Patent
Rotole et al.

(10) Patent No.: US 8,671,834 B1
(45) Date of Patent: Mar. 18, 2014

(54) TWINE TENSIONER ARM POSITION SENSOR ARRANGEMENT

(71) Applicant: Deere & Company, Moline, IL (US)

(72) Inventors: David V. Rotole, Bloomfield, IA (US); Eric R. Lang, Newhall, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/690,012

(22) Filed: Nov. 30, 2012

(51) Int. Cl.
*A01F 15/14* (2006.01)
*B65B 13/22* (2006.01)

(52) U.S. Cl.
USPC ............... 100/4; 100/19 R; 100/32; 100/33 R

(58) Field of Classification Search
USPC ...... 100/4, 13, 17, 18, 19 R, 29, 32, 33 R, 43; 289/2, 18.1; 56/343, 433, 435, 439, 56/441, 442, 444, 445
See application file for complete search history.

(56) References Cited

U.S. PATENT DOCUMENTS

| 3,895,571 | A | * | 7/1975 | Freeman ........................... 100/4 |
| 4,074,623 | A | | 2/1978 | White |
| 4,196,661 | A | | 4/1980 | Yatcilla et al. |
| 4,753,463 | A | | 6/1988 | Strosser |
| 4,753,464 | A | | 6/1988 | Jackson |
| 4,765,235 | A | | 8/1988 | Schrag et al. |
| 4,924,564 | A | * | 5/1990 | Shah ............................. 126/512 |
| 5,937,746 | A | | 8/1999 | Jonckheere et al. |
| 5,988,053 | A | * | 11/1999 | Leupe et al. ...................... 100/3 |
| 2004/0134360 | A1 | * | 7/2004 | Rotole ............................ 100/29 |

* cited by examiner

*Primary Examiner* — Jimmy T Nguyen

(57) ABSTRACT

A plurality of twine tensioner arms are mounted at evenly spaced locations across the baling chamber of a large square baler for pivoting vertically, against a yieldable bias, between upper and lower extreme positions. Each tensioner arm carries a tensioned twine strand associated with a double-knot tying device. A rotary potentiometer is coupled, by a follower arm, for sensing pivotal movement of each tensioner arm and sends out a corresponding electrical signal to an electronic controller which processes the sensed arm position together with other stored information and sends out a signal for energizing a display showing the relative positions of the arms and/or for energizing a warning device for apprising an operator that a mistie has occurred, is about to occur or that a twine tensioner setting has to be changed.

20 Claims, 7 Drawing Sheets

TWINE TENSIONER ARM POSITION SENSOR ARRANGEMENT

FIELD OF THE INVENTION

The present invention relates to mechanisms for tying loops of twine about large parallelepiped bales formed in the baling chamber of a so-called large square baler, and more specifically, relates to a twine tensioner position sensor arrangement for such tying mechanisms.

BACKGROUND OF THE INVENTION

Current large square balers are equipped with a plurality of pivotally mounted, upwardly biased twine tensioner arms, sometimes called slack take-up arms, respectively associated with a plurality of knotter assemblies (each knotter assembly described hereinafter is a double-tie knotter assembly) to maintain proper tension on the twine to ensure each knotter assembly performs properly. If the twine tensioner arm fails to maintain proper tension on the twine, the twine can be pulled out of the knotter assembly and a mistie occurs.

As a bale is being formed, the twine tensioner arms normally rotate approximately 30° from an initial extreme upper position to a lower extreme position. At the ending of the bale formation process, each twine tensioner arm should be located at the lowermost extreme position, and when the bale is complete and a knot has been sucessfully tied, each tensioner arm should return to the uppermost extreme position. If any of the tensioner arms are at either of these positions any time other than at the beginning or ending of the bale tying cycle, it indicates that something failed and a mistie has occurred.

Various tie monitoring devices have been designed for determining whether or not a mistie has occurred. For example, U.S. Pat. No. 4,765,235 discloses a tie monitoring device comprising upper and lower sensing rods which respectively extend horizontally above and below the tensioner arms of all of the knotters, with each of the rods having opposite ends carried by a pivotally mounted arm. Gravity maintains the upper rod in contact with the tops of the tensioner arms and a spring is coupled to each of the lower rod carrying arms so as to bias the lower rod upwardly into contact with the bottoms of the tensioner arms. Magnets are respectively carried at the outer end of one of the arms carrying the upper rod and at the outer end of one of the arms carrying the lower rod, with upper and lower sensors being mounted on the frame so as to register with these magnets to create a signal for being processed by a microprocessor only when the tensioner arms are in their extreme upper or lower positions. If the microprocessor determines that the signal received is at a time other than normal, a visual display within the tractor cab is activated to show a check knotter notation and an audible alarm is sounded. This patented design has the drawback that there is no way to determine which knotter has mistied since, due to the operation of the upper and lower rods, only one signal is generated to indicate a mistie at the beginning of the formation of a bale and only one signal is generated to indicate a mistie at the end of the formation of a bale.

Another microprocessor based mistie monitor or detector which does indicate to an operator which knotter has failed is disclosed in U.S. Pat. No. 4,753,463 (this mistie detector is associated with a different and more complex tensioner arm arrangement which is disclosed in U.S. Pat. No. 4,753,464) which provides switches located in the tying apparatus at such locations that they provide signals which can be processed so as to give an operator a first indication if a given knotter does not cycle and a second indication if a given knotter fails to tie a knot. This patented design has the drawbacks that: (a) the tensioner arm arrangements are relatively complex; and (b) the operator is not apprised of the relative positions of the tensioner arms one to another during the course of each tying cycle, resulting in the operator not having sufficient information from which to earlier detect or diagnose a pending mistie failure.

U.S. Pat. No. 4,196,661 discloses a mechanical mistie monitoring arrangement comprising a plurality of flags respectively mounted to the plurality of tensioner arms for moving up and down with the tensioner arms so that an operator can determine the relative position of one tensioner arm to another during a tying cycle. However, this arrangement has the drawbacks that: (a) the operator is required to look rearward to see the flags, thus distracting the operator and interfering with the operator's attention to other important operations; and (b) the operator's view is obstructed by such things as a dirty cab window and/or a cloud of dust as is often generated by the baler during baling operation. In another embodiment, a plurality of switches are respectively associated with the tensioner arms and are located so as to be closed and activate an alarm in the event that the tensioner arms move to a position indicating a mistie has occurred.

What is needed then is a microprocessor based tensioning arm position monitoring arrangement which senses the positions of the tensioner arms as they move between upper and lower extreme positions and which provides an in-cab display of individual tensioner arm positions during tying cycles and which uses this information to foresee misties, and/or determine that tensioner mechanisms are not set correctly, as well as determine when misties have already taken place.

SUMMARY OF THE INVENTION

According to the present invention, there is provided a large square baler equipped with an improved bale tying system including a microprocessor based twine tensioner arm position monitoring arrangement for displaying relative tensioner arm positions and mistie information, and/or for apprising an operator of actions which should be taken.

An object of the invention is provide such a microprocessor based tensioner arm position monitoring arrangement including tensioner arm position sensors for respectively generating signals relating to current positions of the tensioner arms during a tying cycle and from which visual information is continually displayed showing the relative positions of the tensioner arms.

A further object of the invention is to provide such a tensioner arm position monitioring arrangement, as set forth in the previous object, wherein the tensioner arms are each defined by a simple, pivotally mounted, upwardly biased arm assembly including a twine guide at its free end, and wherein an arm position sensor is associated with each tensioner arm for continuously monitoring the amount that the tensioner arm is moved downwardly from an upper extreme position. In a second embodiment, each tensioner arm is defined by a cantilever-mounted arm formed of a spring wire rod having a coiled inner end providing the upward bias of the arm.

These and other objects of the invention will be apparent from a reading of the ensuing description together with the appended drawings.

DESCRIPTION OF THE PREFERRED EMBODIMENT

Figure 1:
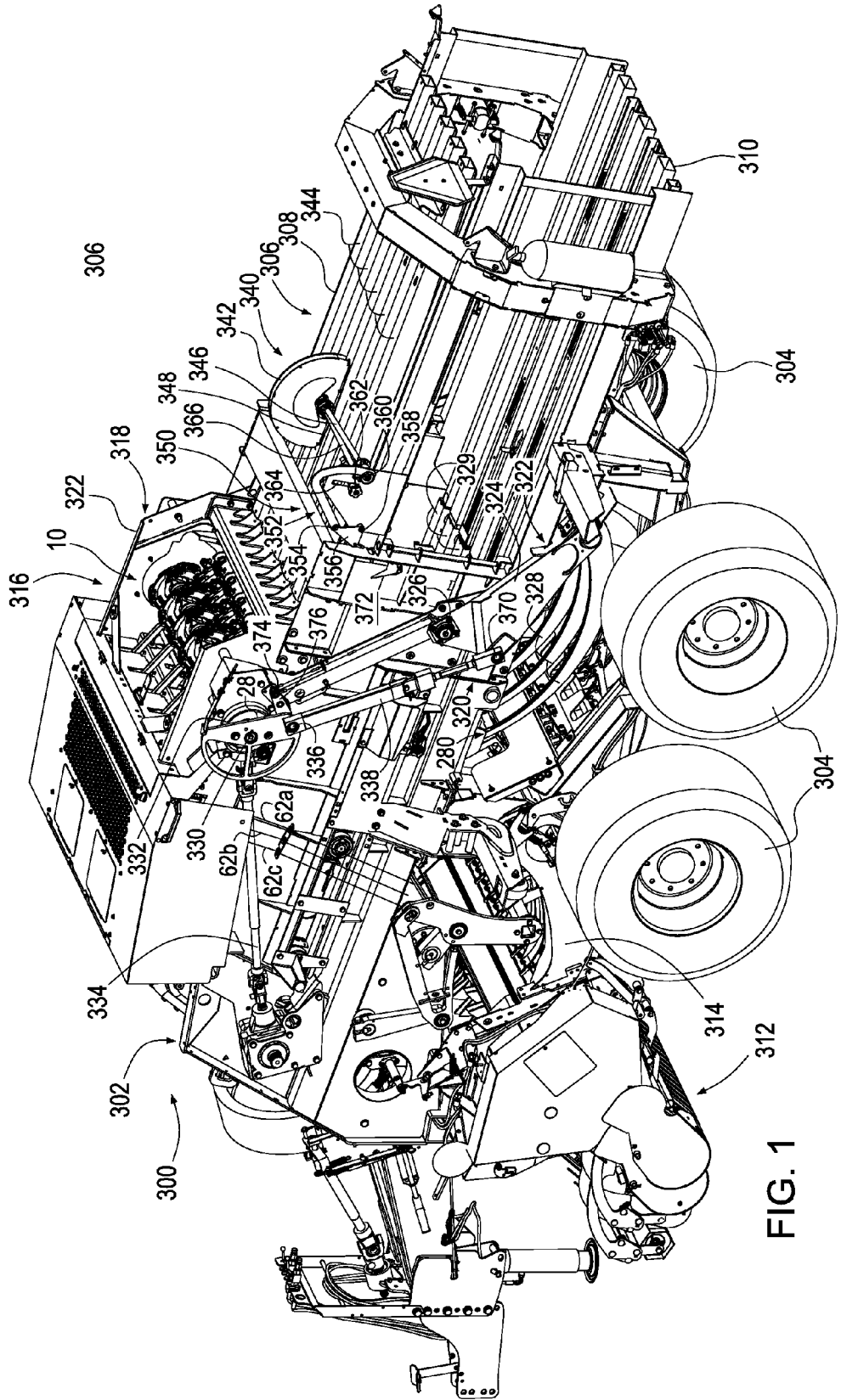
FIG. 1 is a left rear perspective view of a large square baler equipped with a knotter together with a twine tensioner arm arrangement constructed in accordance with the present invention, with side walls of the baling chamber being removed for the sake of clarity.
Figure 2:
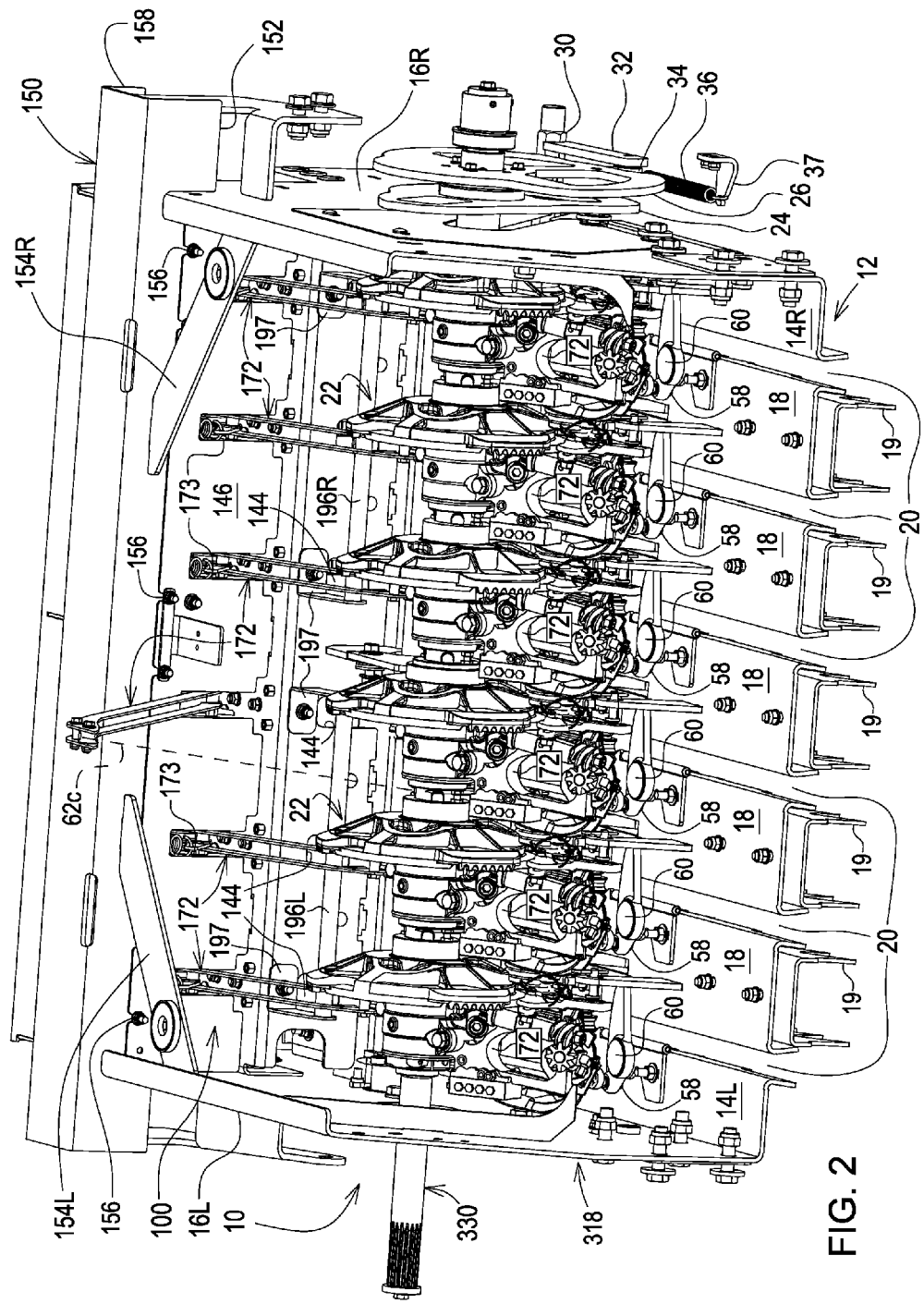
FIG. 2 is a right rear perspective view of a portion of the knotter and twine tensioner arrangements shown in FIG. 1 and showing one of the tensioner arms in an elevated position indicating that a mistie has occurred.

Referring now to FIGS. 1 and 2, there is shown a large square baler 300 including a main frame 302 supported on ground wheels 304 for being towed across a field containing windrows of crop to be baled. The main frame 302 includes a baling chamber 306 extending longitudinally from a forward central location of the baler 300. The baling chamber 306 includes top and bottom walls 308 and 310 joined by right- and left hand upright side walls.

A crop pick-up and conditioning arrangement 312 is provided at a front underside location of the main frame 302 and feeds gathered crop through a crop delivery chute 314 that curves upwardly and rearwardly from the pick-up and conditioning arrangement 312 and delivers crop through an opening (not shown) provided in the baling chamber bottom wall 310 from where it is periodically engaged by a reciprocating plunger (not shown) and pushed to the rear to form a compressed bale of crop.

A knotter table 316 includes a knotter arrangement 10 and an associated twine tensioner arrangement 100 as part of a system for tying six loops of twine about a large parallelepiped bale formed in the baling chamber 306, noting that for different sizes of balers a knotter table for tying a different number of loops of twine may be used without departing from the principles of the present invention.

The knotter table 316 includes a support frame 318 comprising a bottom wall 12 including L-shaped right- and left-hand bottom wall segments 14R and 14L respectively being formed by inwardly bent, L-shaped portions of right- and left-hand side walls 16R and 16L. The bottom wall 12 further includes a plurality of central bottom wall segments 18 comprising downwardly opening, longitudinally extending channel members that are spaced from each other and from the short legs of the wall segments 14R and 14L to define six longitudinal slots 20. The central bottom wall segments 18 respectively receive, and are fixed to, longitudinally extending, complementary shaped channel members 19 forming a rear region of the top wall 308 of the baling chamber.

A twine delivery needle arrangement 320 includes a needle support frame 322 comprising a transverse member (not shown) extending beneath the baling chamber 306 and having right- and left-hand arms extending upwardly adjacent the opposite side walls of the baling chamber and being respectively mounted to the side walls for pivoting about a horizontal transverse axis, with only a left-hand arm 324 and pivotal connection 326 being shown. Six longitudinally extending curved twine-delivery needles 328 (only three being visible) are mounted equally-spaced across the transverse member of the frame 322 so as to respectively be aligned for passage through the six slots 20 when the needle frame 322 pivots upwardly from a lowered stand-by position, shown in FIG. 1, wherein it is below the bottom wall 310 of the baling chamber, to a twine delivery position wherein end regions of the needles project upwardly through the slots 20, noting that the bottom wall 310 of the baling chamber is provided with six slots 329 which are vertically aligned with the slots 16 so as to permit passage of the needles 328.

A central component of the knotter arrangement 10 is a knotter gear drive shaft 330 extending transversely to a direction of travel of the baler. Opposite end regions of the drive shaft 330 are each supported in bearing assemblies (not shown) including right and left bearing housings respectively mounted to the right and left vertical side walls 16R and 16L. An angle drive gear box arrangement 332 including a dog clutch device (not shown, but see U.S. Pat. No. 5,937,746, incorporated herein by reference for a dog clutch device of a type similar to that used for effecting coupling of the angle drive gear box arrangement 332 to the knotter gear drive shaft 330) is mounted to the left-hand side wall 16L. An input drive shaft 334 is coupled to an input shaft of the gear box arrangement 332, the knotter gear drive shaft 330 serving as the output of the gear box arrangement.

A bale length measuring device 340 is provided for controlling operation of the dog-clutch device (not shown) and includes a star wheel 342 having a toothed periphery (teeth not shown) and being supported for rotation within a longitudinally elongated opening provided centrally in a central one of five elongated tubular members 344 defining forming part of the baling chamber top wall 308 that are aligned with, and extend rearwardly from the top wall members 19 located beneath the knotter table 316. The star wheel 342 is secured to a right-hand end region of a drive shaft 346 rotatably supported in right- and left-hand brackets, respectively located at opposite sides of the star wheel 342 and fixed to the tubular member 344, with only the left-hand bracket 348 being shown. The teeth (not shown) of the star wheel 342 project into the baling chamber 306 a distance sufficient for being engaged by the forming bale, causing the drive shaft 346 to be rotated counterclockwise, as viewed in FIG. 1. The drive shaft 346 projects transversely to the left from the star wheel 342 and has a left end region mounted for rotation within an upright support bracket 349 fixed to an upper region of the left-hand side wall of the baling chamber 306.

A trip mechanism 350, of which only a rear portion is shown, is provided for tripping the dog clutch device (not shown) for effecting engagement of the drive for the knotter gear drive shaft 330 when the star wheel 342 has undergone a rotation corresponding to the bale being formed reaching a preselected length. The trip mechanism 350 includes a reverse L-shaped trip arm 352 having a curved leg joined to, and projecting downwardly from the rear end of a straight leg having a forward end pivotally mounted, as at pivot pin 354 to a top corner of a triangular-shaped lever 356 having a rear corner pivotally mounted, as at pivot pin 358 to the support bracket 349. A friction roller 360 is mounted at the left end of the drive shaft 346 for being driven due to rotation of the star wheel 342 and the curved leg of the trip arm 352 is gripped between right- and left-hand segments of a friction roller 360 for being driven upwardly from an initial lower position (not shown), determined by a stop 362 mounted for being selectively fixed at chosen positions within a vertical slot 364 provided in the bracket 349 in a location for being engaged by the straight leg of the trip arm 352. The curved leg of the trip arm 352 is curved at a radius about the pivot pin 354 connecting of the trip arm with the triangular lever 356 so that upward movement of the trip arm 352 is not transmitted to the lever 356 until the drive shaft 346 arrives at a notch (not shown) provided in a lower front edge region of the curved leg, this happening when the desired bale length has been achieved.

Also mounted for being driven by the star wheel 342 is a switch control shaft 366 that has a left end supported for rotation by the bracket 349, the left end region of the shaft 368 supporting a cam (not shown) that operates to close a normally open switch (not shown) mounted to the bracket 349 and having a switch element engaged by the cam so that it is closed contemporaneously with the tripping of the dog clutch assembly for initiating the tying operation, as more fully described below.

Six identical knotter assemblies 22 are mounted at equally spaced locations across the length of the drive shaft 330. Mounted on the shaft 330 just axially outboard of the side wall 16R is a twine position control cam plate 24 and located just axially outboard of the cam plate 24 is a twine finger control cam plate 26. Fixed to the extreme outer left end of the drive shaft 330 is a needle assembly drive arm 28 that is pivotally coupled, as at a pivotal connection 336, to an upper end of a first drive link 338 having a lower end pivotally coupled to the needle support frame arm 324 by a pivotal connection 370 located below the pivotal connection 326 coupling the needle support arm 324 to the baling chamber. Drive link 338 is a first link of a four-bar linkage including a second drive link 372 having a lower end coupled to the arm 324 at the pivot connection 326 and having an upper end pivotally coupled, as a pivotal connection 374, to one end of a short link 376 having its other end pivotally coupled to the drive arm 28 at the pivotal connection 336.

Figure 3:
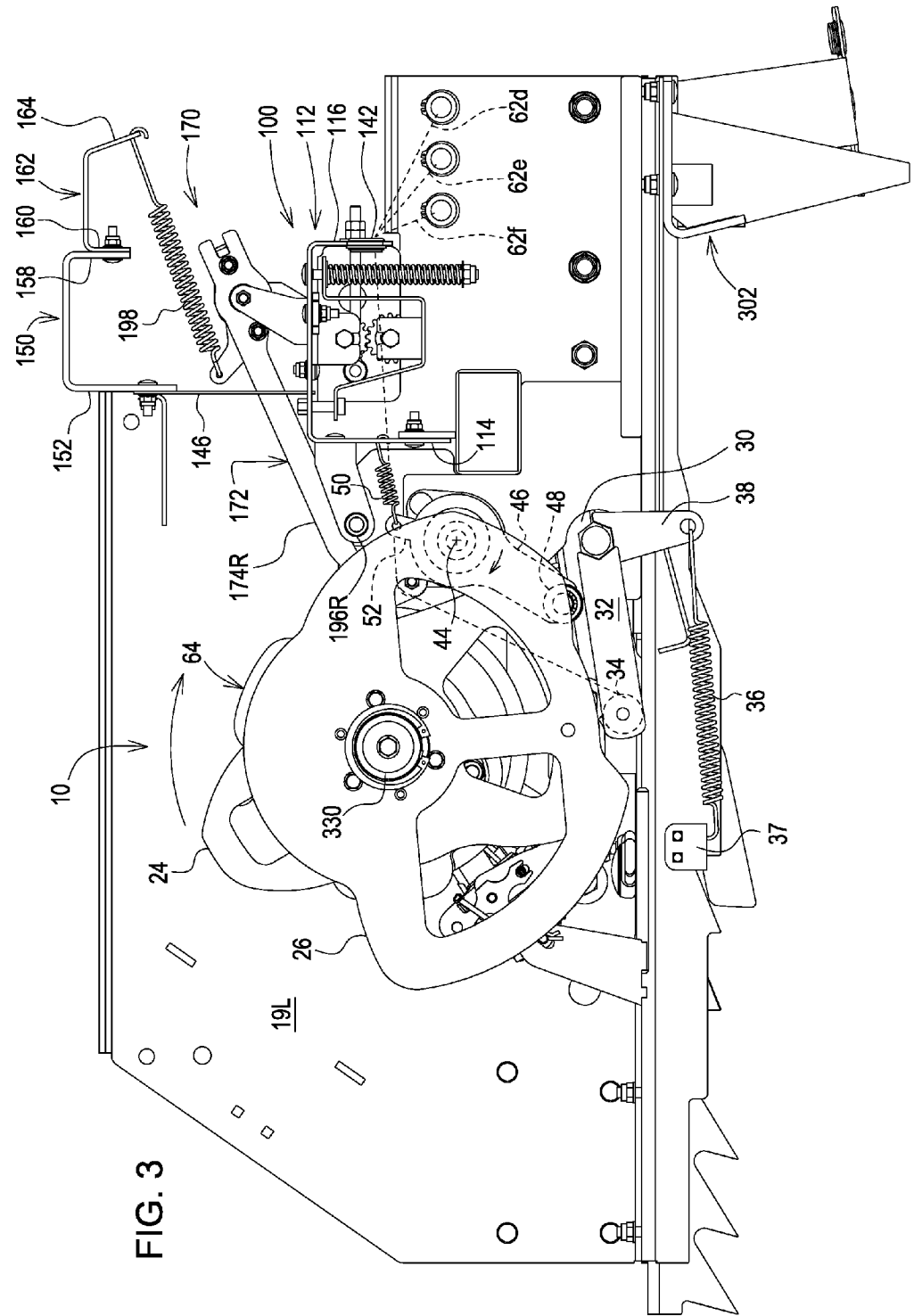
FIG. 3 is a right side view, with parts removed, of the knotter and twine tensioner arrangements of FIG. 2.
Figure 4:
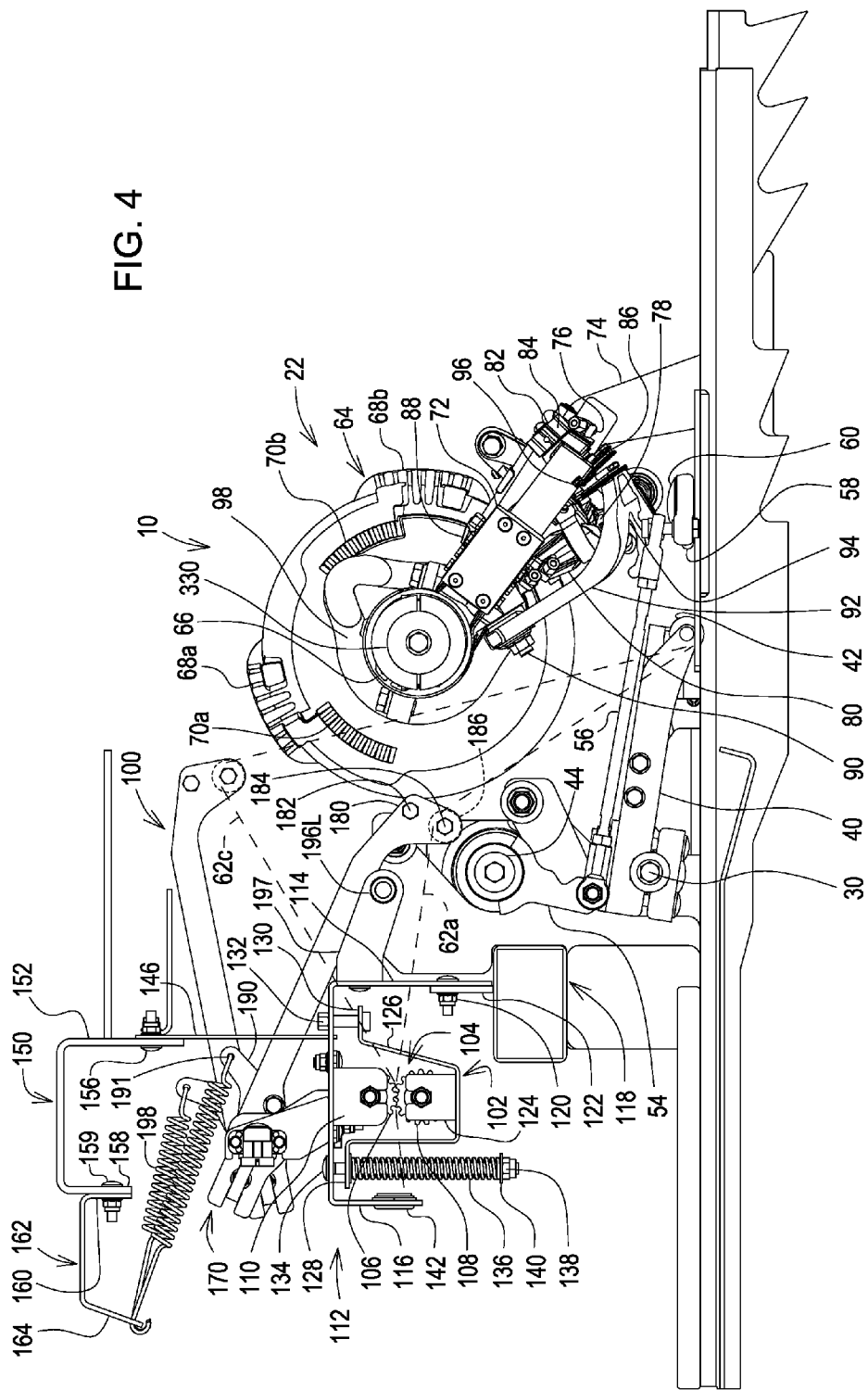
FIG. 4 is a left side view, with parts removed, of the knotter and twine tensioner arrangements of FIG. 2.

Referring now also to FIGS. 3 and 4, it can be seen that a twine position control shaft 30 is mounted forward of the cam plates 24 and 26 at an elevation just above the top wall 12 of the knotter table frame 318, with opposite ends of the shaft 30 being rotatably mounted in bearings carried by bearing support plates (not shown). A cam follower arm 32 is joined to, and projects rearward from, the control shaft 30 and carries a roller 34 engaged with a cam track defined by an outer edge of the cam plate 26. A coil tension spring 36 is tensioned between a support frame anchor point 37 and a lower end of an arm 38 fixed to, and projecting downward from, a rightward end location of the shaft 30 so as to maintain the roller 34 in contact with the cam track of the plate 26.

As is apparent in FIG. 4, oscillatory motion imparted to the twine position control shaft 30, as the roller 34 follows the cam track defined by the cam plate 26 when the drive shaft 330 is driven, is transferred to six transversely spaced twine position control arms 40 joined to, and projecting rearward from equally spaced predefined locations of the shaft 30, with each arm 40 having a twine guide roller 42 at its rearward end.

A twine finger control shaft 44 is mounted vertically above the twine tension control shaft 30 and, like the shaft 30, has opposite ends rotatably received in bearings carried by the bearing support plates (not shown). A cam follower arm 46 (see FIG. 3) is joined to and projects rearwardly from a right end location of the shaft 44 and carries a follower roller 48 biased into engagement with a cam track, defined by an edge of the cam plate 24, by a coil tension spring 50 (shown schematically in FIG. 3) tensioned between an anchor point of the support frame and an arm 52 joined to, and projecting upwardly from, the shaft 44 at a location that is just leftward of the cam plate 24. Oscillatory motion imparted to the twine finger control shaft 44, as the follower roller 48 follows the cam track defined by an edge of the cam plate 24 when the drive shaft 330 is driven, is transferred to a plurality of twine finger control arms 54 (only the leftmost arm being visible in see FIG. 4) joined to, and projecting downward from, predefined locations of the shaft 44, with each arm 54 having a lower end pivotally coupled to a front end of a motion transfer link 56 extending rearward and having its rear end universally coupled to one end of a substantially horizontal plate-like twine finger 58 mounted to the top wall of the baling chamber for pivoting a vertical axis defined by a mounting bolt 60. As shown in FIGS. 2 and 3, the cam plate 24 is located such that the control shaft 44 is in a maximum clockwise position with the plurality of arms 54 respectively holding the plurality of links 56 at maximum forward positions wherein they respectively hold the plurality of twine fingers 58 in maximum clockwise positions about the axes of the plurality of mounting bolts 60. When in their maximum clockwise positions, the fingers 58 respectively extend across adjacent longitudinal slots 20 in the top 12 of the baling chamber and beneath associated ones of six twine strands 62a-62f, as considered from left to right. The twine strands 62a-62f are respectively located in alignment with the six slots 20 in the top wall 12 of the baling chamber and pass rearwardly beneath the twine guide rollers 42 of the fore-and-aft aligned twine position control arms 40, the vertical positions of the guide rollers 42 and, hence the arms 40, being determined by the location of the of the cam track of the cam plate 26 that is in engagement with the roller 34 of the cam guide arm 32.

As can best be seen in FIGS. 2 and 4, each knotter assembly 22 further includes a generally circular drive gear 64 having an integral cylindrical hub 66 received on, and keyed for rotation with, the shaft 330. A left face of each drive gear 64 is provided with a pair of radially outer, annularly spaced, axially projecting gear tooth segments 68a and 68b, respectively, and with a pair of radially inner, annularly spaced, axially projecting gear tooth segments 70a and 70b, respectively, the gear tooth segments having purposes explained below.

Each knotter assembly 22 further includes a knotter frame 72 having an upper end defined by a two-piece cylindrical sleeve received on a left end section of the gear hub 66 so as to permit the hub to rotate relative to the knotter frame 72, the latter being anchored to the top wall 12 of the baling chamber through the agency of an upright anchor member 74 having a lower end fixed to an upper surface of an adjacent one of the bottom wall segments 18 of the frame 318 of the knotter table 316, with a lower end of the knotter frame 72 being secured to an upper region of the anchor member 74 by a pin 76.

Knot-forming components are mounted on each knotter frame 72. As can best be seen in FIG. 4, a bill hook 78 is carried at the bottom of a bill hook spindle mounted in the knotter frame 72 for rotation about a first upwardly and forwardly inclined axis, with a bevel gear 80 being carried at the top of the spindle at a location for being driven by the outer gear tooth segments 68a and 68b of the knotter gear 14. A worm gear spindle is mounted to the frame 32 for rotation about a second upwardly and forwardly inclined axis and carries a worm gear 82 at its lower end meshed with a drive gear 84 coupled to an upper end of a twine holder spindle that is mounted in the frame 72 for rotation about a rearwardly and upwardly inclined third axis, the spindle having a multi-disc twine holder 86 secured to its lower end at a location behind and closely adjacent the bill hook 78, the twine holder acting for holding strands of twine in a position for engagement by the bill hook 78 during rotation of the latter. The upper end of the worm gear spindle carries a bevel gear 88 located for meshing with the inner gear tooth segments 70a and 70b of the knotter gear 64. Mounted to an upper front underside location of the knotter frame 72 for swinging about an upwardly and rearwardly extending pivot axis defined by a pivot bolt 90 is a downwardly and rearwardly extending knife arm 92 having a forked lower end defining a crotch 94 (FIG. 4) opening upwardly at a location just in front of the bill hook 78. A knife 96 is mounted to the arm 92 at a location between the bill hook 38 and the twine holder 46 for severing twine strands in response to transverse swinging movement of the arm 92 about the axis of bolt 90 at the proper time during the tying cycle. Such movement of the arm 92 to operate the knife 96 serves to engage the proximal areas of the crotch 94 with a knot formed on the bill hook 78 for stripping the knot off the bill hook. Swinging movement of the arm 92 at the proper time during the tying cycle is achieved by providing the arm 92 with an end portion (not visible) that extends transversely relative to the pivot axis defined by the pivot bolt 90 and carries a follower roller (not visible) which is received within a cam track 98 provided in the face of the knotter drive gear 64.

The twine tensioner arrangement 100 comprises a twine tensioner assembly 102 associated with each knotter assembly 22. Each twine tensioner assembly 102 includes a twine tensioner or gripper 104 including upper and lower ribbed rollers 106 and 108, respectively. The upper roller 106 is received between and rotatably mounted to, opposite depending legs of a U-shaped bracket 110 fixed to an under surface of a horizontal, transversely extending, inverted channel member 112 having a rear leg 114 that is longer than a front leg 116, with the rear leg 114 having a bottom edge disposed adjacent a top of a transverse support beam 118 and being fixed, as by nut and bolt assemblies 120, to transversely spaced locations of a transverse vertical flange 122 overlapping a lower region of the leg 114 and being welded to the top of the beam 118. The lower roller 108 has ribs in meshed engagement with ribs of the upper roller 106, and is received between and rotatably mounted to opposite legs of a U-shaped bracket 124 mounted to an upper surface of a U-shaped carrier 126 having opposite, upwardly projecting legs terminating in front and rear mounting flanges 128 and 130, respectively. A pair of transversely spaced guide bolts 132 (only one visible) extend vertically through axially aligned holes provided in the inverted channel member 112 and the rear mounting flange 130. A second pair of transversely spaced guide bolts 134 (only one visible), which are much longer than the guide bolts 132, extend vertically through axially aligned holes provided in the channel member 112 and the front mounting flange 128, with a coil compression spring 136 being received on a length of each of the bolts 128 extending below the front mounting flange 128 and compressed by a nut 138 screwed onto a bottom end of the bolt 134 and acting against a washer 140 engaged with the bottom of the spring 136. Thus, the ribbed rollers 106 and 108 are yieldably biased into meshed engagement with each other so as to maintain a resistance to a length of twine being pulled rearwardly through the nip of the meshed rollers 106 and 108, as is known in the art.

The front leg 116 of the inverted channel member 112 extends transversely behind the plurality of pairs of ribbed rollers 106 and 108 and contains a plurality of circular twine guides 142 respectively aligned with the nips of the plurality of pairs of rollers 106 and 108. Associated with each pair of ribbed rollers 106 and 108 is one of the twine strands 62a-62f, with each twine strand extending forwardly through an associated one of the twine guides 142, then transversely through respective twine guides provided in side plates of the baler and then being joined to a supply roll (not shown) located in a twine bin located at a side location of the baler. Respectively extending rearwardly from the plurality of pairs of rollers 106 and 108 are the plurality of twine strands 62a-62f, the latter each extending rearwardly through an aligned slot 144 (see FIG. 2) provided in a bottom edge of the rear leg 114 of the channel member 112.

The inverted channel member 112 is provided with a plurality of transverse slots in a region spaced forward from the rear leg 114, and a vertical, transversely extending plate 146 has a lower edge provided with a plurality of tabs located in the slots. A second transversely extending, inverted channel member 150 has opposite ends respectively extending outwardly beyond the side walls 19R and 19L, with a rear channel leg 152 abutting and being welded to a downwardly stepped region of each side wall 16R and 16L. Welded between the rear channel leg 152 and the right and left side walls 16R and 16L are right and left horizontal, diagonal braces 154R and 154L. The rear channel leg 152 overlaps an upper region of the plate 146 containing transversely spaced slots, with holes in the leg 152 being aligned with the slots, and with bolts of a plurality of nut and bolt assemblies 156 being inserted through the aligned holes and slots and receiving tightened nuts thereby securing the channel member 150 the plate 146. A front leg 158 of the channel member 150 is shorter than the rear leg 152, and bolted to the front leg 158, as by a plurality of nut and bolt assemblies 159, is a rear leg 160 of a third transversely extending inverted channel member 162 (FIG. 4) having an forwardly angled front leg 164 containing a plurality of transversely spaced holes 166 (FIG. 5) having a purpose described below.

Figure 5:
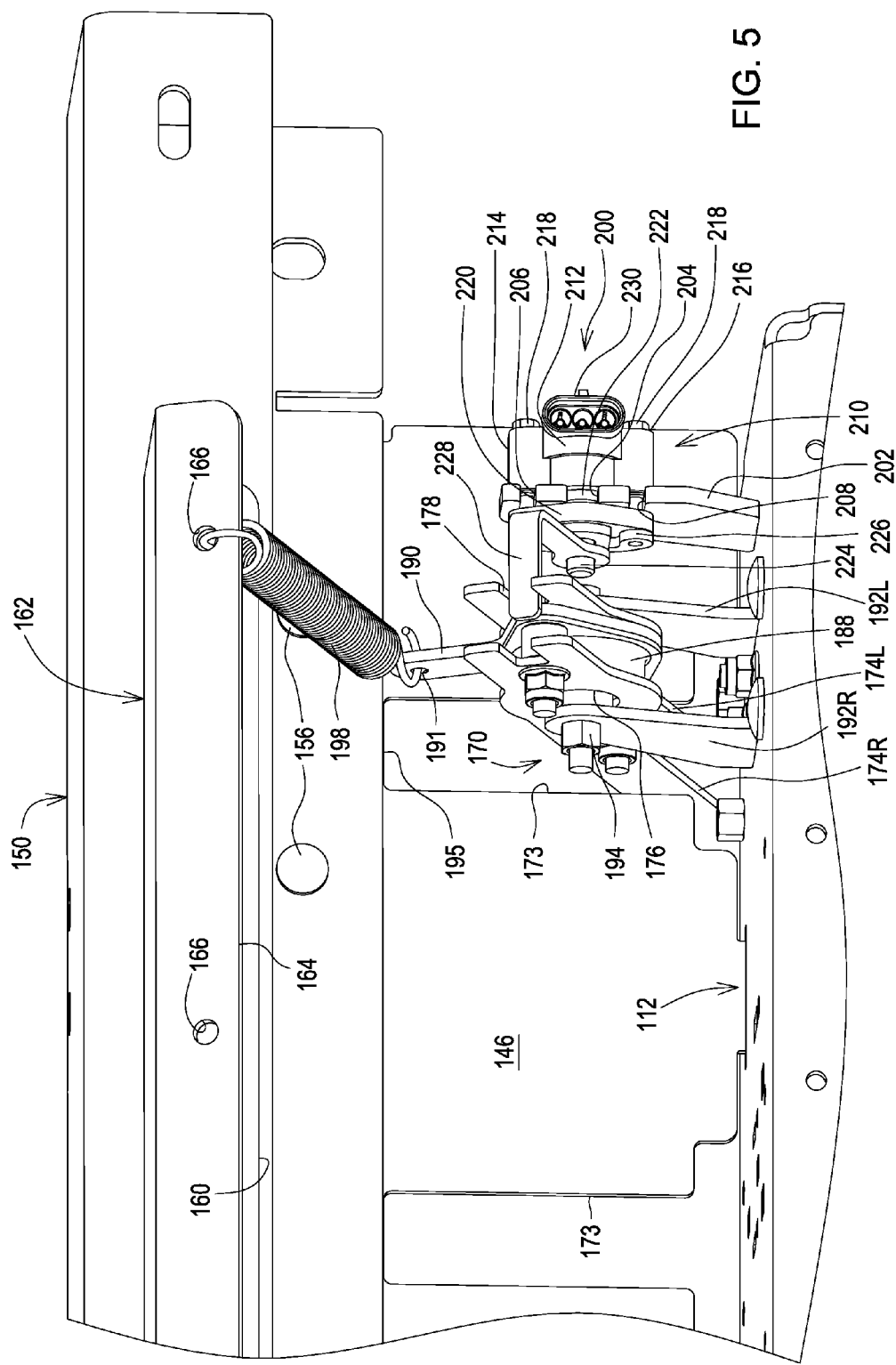
FIG. 5 is a right front perspective view showing the mounting of one of the twine tensioner arms together with an arm position sensor.

Referring now also to FIG. 5, it can be seen that each twine tensioner assembly 102 further includes a twine tensioner arm or slack take-up arm assembly 170 mounted to a top surface of the first inverted channel member 112 at a location vertically above a respective twine gripper 104. Each tensioner arm assembly 170 includes a an elongate, fore-and-aft extending tensioner arm 172 that projects rearwardly through a notch 173 provided in the vertical transverse plate 146 such that it extends upwardly from a lower edge of the plate. The tensioner arm 172 is formed from a pair of identical parallel, elongate straps 174R and 174L, each strap including a transverse bearing body clearance hole 176 spaced forwardly from a front end of the straps 174R and 174L, and including a front edge provided with a forwardly opening notch 178, having a purpose explained below. A rearward end of each strap 174R and 174L is provided with a downwardly projecting rear end region or section 180 (see FIG. 4), with the end regions 180 of the straps being connected together in spaced parallel relationship by an upper cross pin 182 and by a lower cross pin 184 on which a twine guide roller 186 is mounted. A bearing housing 188 is received between front end regions of the straps 174R and 174L and includes portions extending into the clearance holes 176, the bearing housing 188 including a flange to which the straps are fixed by a threaded fastener (not shown) extending through aligned holes provided in the straps and the flange. The tensioner arm 172 includes a short arm 190 that projects upwardly from a lower portion sandwiched between the bearing housing flange and the left strap 174L and is held in place by the threaded fastener, with a biasing spring mounting hole 191 being provided in an upper region of the arm 190 for a purpose explained below. Provided for pivotally supporting the front end of each tensioner arm 172 from the inverted channel member 112 are a parallel pair of transversely spaced upright support legs 192R and 192L having upper end regions located on opposite sides of the bearing housing portions that are received in the clearance holes 176 of the straps 174R and 174L, the upper regions of the support legs being provided with respective holes located in axial alignment with a transverse cylindrical opening extending through the bearing housing, with a bearing (not shown) being pressed into the opening. Received in the aligned holes in legs 192R and 192L and the bearing provided in the bearing housing 188 is a bolt (not shown) that is held in place by a nut 194, the bolt serving as an axle about which the arm 172, together with the bearing housing 188 and bearing, is pivotable between an extreme upper position, wherein the arm 172 engages an up-stop defined by an upper edge 195 of the slot 173, and an extreme lower position, wherein the arm engages a down-stop defined by right and left axially aligned tubes 196R and 196L extending between, and having opposite ends fixed within, rearwardly projecting legs of right and left pairs of L-brackets 197 having forward legs fixed to a rear surface of the leg 114 of the inverted channel member 112. Each tensioner arm 172 is biased toward its extreme upward position by a coil tension spring 198 having a hook at its forward end received in a respective one of the holes 166 provided in the leg 164 of the channel member 162, and having a hook at its rear end received in the hole 191 provided at an upper location in the mounting arm 190.

A tensioner arm position sensor assembly 200 is provided for sensing the position that the tensioner arm 172 occupies during tying operation. Specifically, the sensor assembly 200 includes an upright sensor support leg 202 disposed parallel to, and spaced leftward of, the support leg 192L, the support leg 202 including a forwardly opening middle receptacle 204 located between forwardly opening upper and lower receptacles 206 and 208, with the middle receptacle being larger than the upper and lower receptacles 206 and 208. The sensor assembly 200 further includes a rotary potentiometer 210 including a housing 212 having upper and lower mounting bosses 214 and 216, respectively, provided with horizontal mounting holes which each contain a mounting bolt 218 inserted from the left ends of each of the bosses 214 and 216, the bolts 218 being received in the upper and lower receptacles 206 and 208 and projecting through aligned holes provided in a clamping plate 220 having a left face engaged with a right face of the support leg 202. The housing 212 further includes a cylindrical end section 222 located centrally between the bosses 214 and 216 and received in the middle receptacle 204. A horizontal sensor shaft 224 is rotatably mounted within the housing 212, extends through the center of the end section 222 and projects rightward from the housing 212 and is loosely received in a hole provided centrally through the clamping plate 220. A C-shaped member 226 has threaded holes in opposite ends thereof with the member 226 being disposed with the holes respectively aligned with and receiving threaded ends of the bolts 218 provided in the upper and lower bosses 214 and 216, the bolts 218 being screwed into the holes with the result that the C-shaped member 226 tightly engages the clamping member 220 against the right face of the support leg 202 and thus secures the sensor 210 to the support leg, with the sensor shaft 224 being in axial alignment with the pivot axis of the associated tensioner arm 170 when the sensor 210 is properly mounted to the support leg 202.

An L-shaped tension arm follower 228 has a first leg provided with a splined hole received on a splined right end region (not shown) of the sensor shaft 224, with a second end of the follower 228 being received in the notch 178 provided in the front end of the left strap 174L of the tensioner arm 172. Accordingly, as the tensioner arm 172 pivots, the pivotal motion of the arm will be transferred to the sensor shaft 224 by the follower 228 resulting in an electrical signal being generated which represents the pivotal position of the arm, noting that the potentiometer 210 includes an electrical receptacle 230 for receiving an electrical plug having appropriate ground and power leads for powering the potentiometer, and a lead for carrying the generated signal to a programmable electric controller 232 (see FIG. 6).

It is here noted that, in addition to the twine tensioner assembly 202 and twine tensioner or slack take-up arm assembly 170, like assemblies are provided at 280 beneath the baling chamber 306 for maintaining and monitoring the tension in six strands of twine respectively extending between twine strand sources and the six twine-delivery needles 328. These assemblies are not further shown for the sake of brevity, suffice it to say that they operate in a manner similar to the described assemblies.

Figure 6:
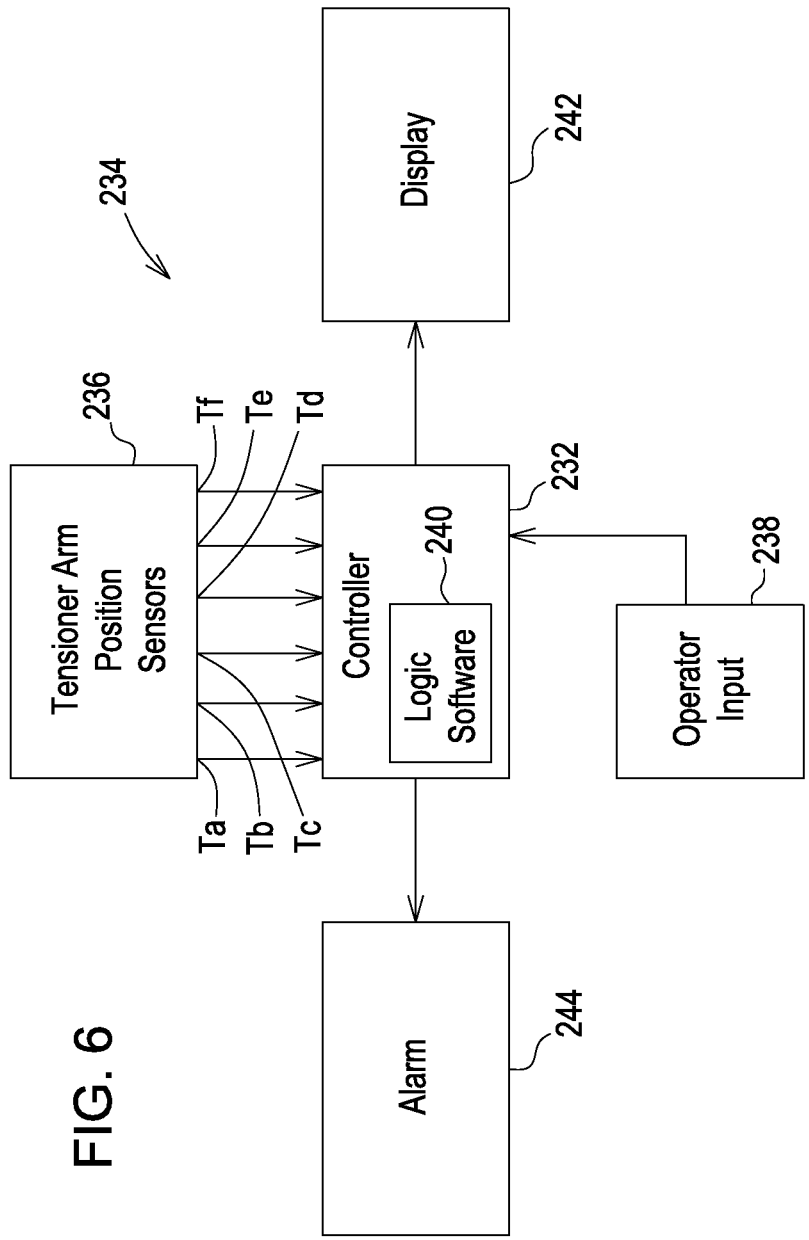
FIG. 6 is a schematic representation of a twine tensioner condition monitoring system utilizing the tensioner arm position sensors of the present invention.

Referring now to FIG. 6, it can be seen that the controller 232 forms part of an electrical twine tying condition monitoring circuit 234, with the controller 232 being coupled for receiving input signals respectively output by the six rotary potentiometers 210 for respectively sensing the positions of the six twine tensioner arms 172, the potentiometers being shown combined together in the functional box 236 labeled "Tensioner Arm Position Sensors". The outputs of six rotary potentiometers associated with the six twine tensioner arms (not shown) located at the bottom of the baling chamber would likewise be coupled to the controller 232 but are omitted for the sake of simplicity. The respective signals output by the tensioner arm position sensors are designated Ta-Tf and correspond to the signals generated from the respective movements of the twine tensioner arms 172 respectively associated with the first twine strands 62a-62f. Also providing input information to the controller 232 is an operator input device 238 such as a data key device or the like, which can be used to key in information for predicting misties from sensed tensioner arm positions. Alternatively, or in addition, logic software information developed for predicting possible misties from sensed tension arm positions can be stored in the controller 232, as indicated at 240. The controller 232 uses the information it receives for generating signals input to a display 242 for lighting a visual display, located in the cab of the towing vehicle, indicating a mistie or possible mistie in a certain twine strand loop. In the event a mistie is pending, the software 240 may initiate a signal to be sent to the display 242 to cause actuation of a "Check Twine Tension" indicator, or the like. The controller 232 may also generate signals input to an audible alarm device 244 indicating that a mistie has occurred or is likely to occur.

The operation of the invention is set forth below.

Preliminarily it is noted that, for the sake of brevity, illustrations of the various steps for tying double knots in each of the loops of twine used to secure finished bales together are omitted. To aid the understanding of how the double knots are tied, reference may be had to each of U.S. Pat. Nos. 4,074,623 and 4,765,235 which contain drawing figures illustrating various steps in the formation of the double knots, with the entirety of the '623 patent being incorporated herein by reference, and with FIGS. 1-10 and the "Mechanical Aspects" of the DETAILED DESCRIPTION contained in columns 3-7 of the '235 patent being incorporated herein by reference.

Assuming that a baler is in operation with the crop pick-up and conditioning arrangement 312 delivering crop to the baling chamber 306 for being compacted into bales, and that a bale of a desired length is just about completed in the baling chamber 306, the knotter gear drive shaft 330 will be in a non-driven condition with the knotter drive gears 64 being in respective standby positions. The forming bale will exert a tension on the strands of twine looped about the rear face of the forming bale, these strands of twine including the first strands of twine 62a-f and a corresponding number of second strands of twine that have respectively been tied to the first strands at the end of the previous tying cycle, noting that the knots tying the second strands of twine to the first strands of twine are located at the upper rear corner of the forming bale with the second strands extending downward through the baling chamber to the bottom of the bale from where they extend forwardly through ends of the six needles 328 located at a standby position below the baling chamber, and from there through the tensioner arms (not shown) of the bottom tensioner arm assembly, then through the nips of the meshed ribbed rollers of the bottom twine tensioner assembly that is similar to the assembly 102, and from there to twine balls carried by the baler.

When a bale is just about completed, the twine tensioner arms 172 will normally be in their respective lower extreme positions wherein they rest against the down-stop forming tubes 196R and 196L. The six rotary potentiometers 210 for respectively sensing the positions of the six tensioner arms 172 will respectively send out like signals Ta-Tf to the controller 232, which in turn will send out appropriate signals to the display 242 for causing the relative positions of the six tensioner arms 172 to be displayed, which in this case would indicate each of the arms to be identically and correctly deflected by the tension in the first twine strands 62a-62f.

At the time when the bale is just about completed, the rearward movement of the bale being formed in the baling chamber 306 will have caused the star wheel 342 of the bale length measuring device 340 to rotate resulting in the friction roller 360 driving the trip arm 352 of the trip mechanism 350 upwardly. Once the length of the bale reaches a desired length, a notch in the curved depending leg of the arm 352 will permit the arm to move rearwardly and transfer movement tripping the dog clutch (not shown) associated with the right angle gear box 332 so as to cause the input drive shaft 334 to be coupled for driving the knotter gear drive shaft 330 and associated knotter gears 64 counterclockwise, as viewed in FIG. 4. Also, the rotation of the shaft 330 will cause the needles 328 to be swung upwardly about the pivot axis defined ty the pivotal connection 326 and corresponding connection at the opposite side of the baling chamber.

This rotation of the knotter gears 64 will effect operation of the six knotter assemblies 22 so that each executes the tying of two knots, in a well known manner briefly described below and clearly described and illustrated in the aforementioned U.S. Pat. Nos. 4,074,623 and 4,765,235. At the time the rotation is initiated, the knotting gears 64 and cam plates 24 and 26 will be in their respective standby positions illustrated in FIGS. 2-4, with the twine fingers 58 being shown in fully clockwise rotated positions wherein they extend across the respective longitudinal slots 20. Once rotation of the knotter gear drive shaft 330 is initiated, the cam plate 24 will quickly rotate such that the following roller 48 of the cam follower arm 46 moves steeply inwardly toward the shaft 330, this movement resulting in the twine finger control shaft 44 rotating counterclockwise, as viewed in FIG. 4, thus causing rearward movement of the arms 54 and motion transfer links 56 and resulting in the twine fingers 58 rotating counterclockwise (FIG. 2) about the shafts 60, with the fingers 58 then being in a standby position wherein they are respectively disposed leftward of the slots 20.

Approximately the first 180° of rotation of the shaft 330 is transferred to the needle assembly drive arm 28 (see FIG. 1) causing the six twine-carrying needles 328 to be simultaneously swung clockwise so as to move the needles from their standby location beneath the baling chamber, as shown in FIG. 1, upwardly through the baling chamber 306, first passing through respective longitudinal slots 329 provided in the bottom wall 310 of the chamber and finally through the slots 20.

At a time prior to the needles being swung a sufficient distance so as project upwardly through the longitudinal slots 20 in the top wall 12 of the baling chamber 306, the cam plate 26 is rotated into a position permitting the follower arm 32 (see FIG. 3) to rise causing the twine position control arms 40 (see FIG. 4) to also rise sufficiently for providing clearance for the needles 328 to move past the guide rollers 42 while positioning the first strands 62a-f for being engaged by the needles and delivered to notches in the twine holders 86 together with the second strands carried at the ends of the needles 328, these second strands emanating from the tensioner arms (not shown) located beneath the baling chamber.

Meantime, the six drive gears 64 will have rotated approximately 180° with the first inner gear segments 70a engaging and driving the bevel gears 88 slightly ahead of the outer gear segments 68a engaging and driving the bevel gears 80. Driving of the bevel gears 88 correspondingly drives the worm gears 82, which in turn drive the gears 84 so as to rotate the twine holders 86 causing them to grip and secure the pairs of first and second twine strands, and with driving of the bevel gears 80 resulting in the bill hooks 78 being rotated to tie first knots in the pairs of first and second twine strands. This tying is aided by the fact that substantially simultaneously with the bill hooks 78 being rotated, the cam plate 24 will have acted through the follower roller 48 and arm 46 to cause the twine finger control shaft 44 to rotate so as to move the links 56 forward causing the twine fingers 58 to be rotated from their standby positions so as to engage the second twine strands and deflect them against the bill hooks 78. While this tying is taking place, the continued rotation of the drive shaft 330 causes the needles 328 to be moved back towards their standby positions below the baling chamber. Concurrently, that portion of each of the drive gear cam tracks 98 for causing the knife arms 92 to swing are respectively engaged by the rollers carried by the arms 92. This swinging of the arms 92 moves the knives 96 respectively across the pairs of first and second strands at locations between the tied first knots, which are held by the bill hooks 78, and the twine holders 86, thereby severing the knots from each of the pairs of first and second strands. This motion of the arms 92 also results in the finished first knots being stripped from the bill hooks 78, with completed loops including the first knots and second knots tied during the previous tying cycle being dropped onto the completed bale.

While the first knots are dropped following severance, the twine strands 62a-f and the corresponding second twine strands are retained by the twine holders 86. Consequently, as the needles continue to retract, the seconds strands are draped downwardly across the bale chamber while the cam plate 24 is rotated to cause the twine position control shaft 30 to be rotated for causing the twine position control arms 40 to be swung downwardly thus positioning the twine guide rollers 42 such that first twine strands 62a-f extend alongside the second twine strands extending between the ends of the withdrawing needles and the twine holders 86. Previous to this movement of the arms 40, the cam plate 26 had been rotated to cause the twine finger control shaft 44 to be rotated for effecting movement of the twine fingers 58 to their respective standby positions alongside the longitudinal slots 20, but following the downward movement of the arms 40, the cam plate 26 once again rotates into a position causing the twine fingers 58 to be rotated so as to engage the first and second pairs of twine strands and position them against the bill hooks 78. At this point in time, the continued rotation of the drive gears 64 bring the second inner gear tooth segments 70b and the second outer gear tooth segments 68b respectively into engagement with the bevel gears 88 and 80 so as to cause the bill hook 78 to rotate to tie a second knot and to cause the twine holder 86 to be rotated to its initial standby position. When the second knot is finished, the cam track 98 is positioned for causing the knife arm 92 to be swung to sever the knots from the holders 86 and to strip the same from the bill hooks 78. This knot becomes the first knot which couples the first twine strands 62a-f and the corresponding second twine strands thereby forming new loops, which at their inception, take the form of an open-ended bights located across the baling chamber for intercepting new flakes of crop material as they are compressed against the preceding completed and tied bale, as is well known. At this time, there has been a loss in tension in the strands tied together by the second knot and the tensioner arms 172 will all swing to a maximum upward position, this position being that occupied by the third from the left side tensioner arm 172 shown in FIG. 2, for example, noting that the upper end 195 of the guide slot 173 serves as an up-stop.

During the formation of the next bale, the tension in the tied together twine strands will increase causing the tensioner arms 172 to move to the maximum downward position occupied by all but the aforementioned third from the left side tensioner arm, with the amount of travel of the arms 172 between the extreme upper and lower positions being approximately 40°.

If the arms 172 are at either of these extreme positions other than at the beginning or end of bale formation, this indicates that something has failed and a mistie has occurred. In the event of a mistie when tying the first knots, tension in the mistied one of the first strands 62a-f will be lost resulting in the tensioner arm 172, which is associated with the mistied first strand, being moved to its extreme upper position by the associated tension spring 198. For example, if the strand 62c is mistied, the arm 172 associated with the strand 62c will move to the extreme upper position shown in each of FIGS. 2 and 4. Since this position is an anomaly of what is supposed to be the case immediately after the first knots are tied, the controller 232, upon receiving the signal from the associated potentiometer 210, will send a signal causing the display 242 to display the position of the tensioner arm 172 associated with the mistied strand 62c relative to the positions of the tensioner arms 172 respectively associated with the remaining first twine strands 62a-b and 62d-f. At the same time, the controller 232 uses the relative tensioner arm position information to activate a display indicating that the operator should check the knotter associated with the twine strand 62c. In addition, an audible alarm may be actuated warning the operator that a mistie has occurred.

The logic software 240 may also act in response to the sensed positions or relative positions of the tensioner arms 172 to send signals to the display 242 for directing the operator to inspect for hung knots and offers possible items to check such as knife arm gap or knife arm cam wear, or to check twine tension (too light) or check for an obstruction to the movement of the twine tensioner arms 172. If the operator determines that the twine tension is too light, the tension afforded by the associated twine tensioner or gripper 104 can be increased by tightening the nuts 138 so as to increase the biasing force exerted by the springs 136 for holding the meshed ribbed rollers 106 and 108 together.

Figure 7:
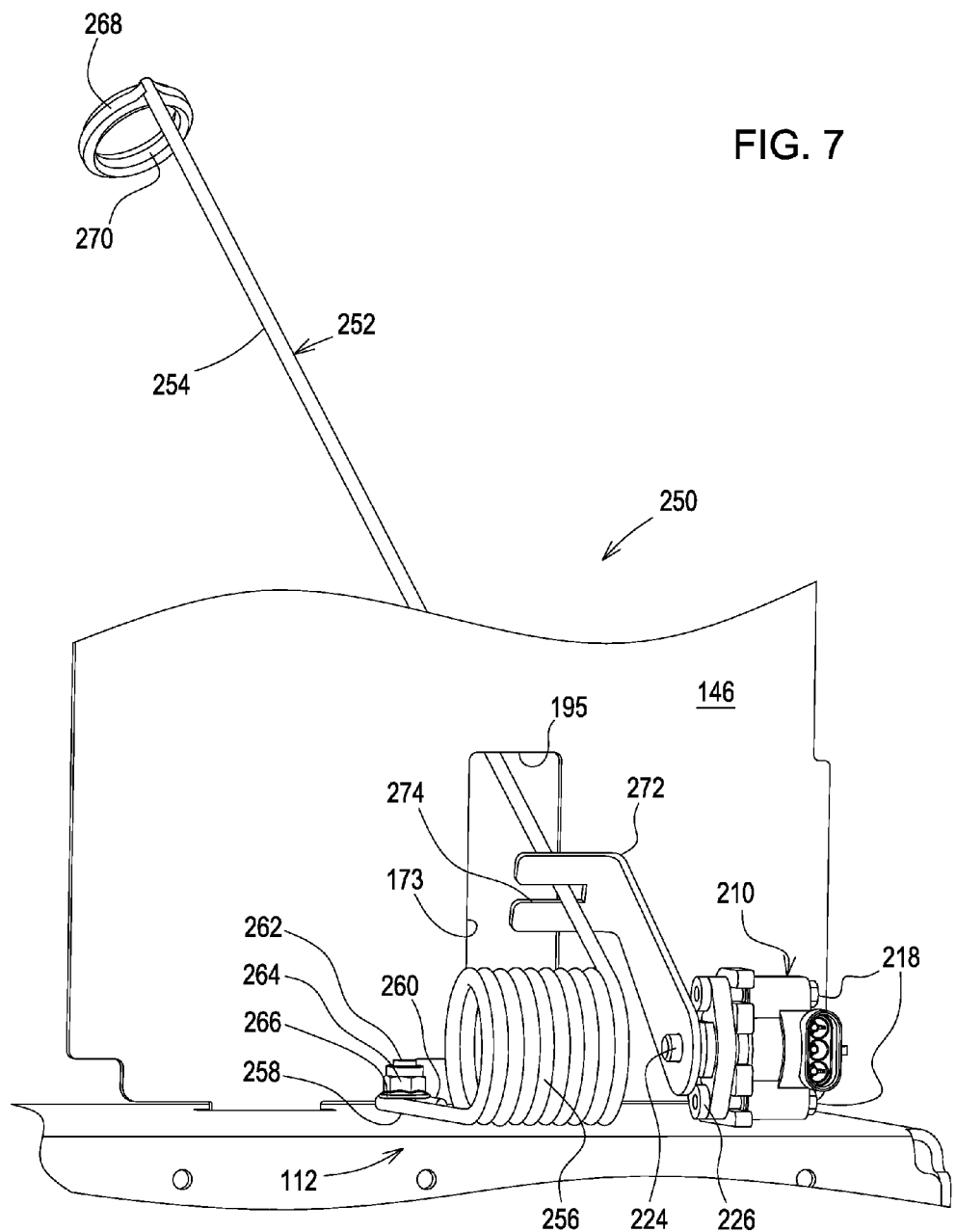
FIG. 7 is a right rear perspective view of one of the tensioner arm assemblies showing a second tensioner arm embodiment.

Referring now to FIG. 7, there is shown a tensioner arm position sensor assembly 250 which includes an alternate embodiment of the tensioner arm 172 and of the tension arm follower 228, with elements like those previously described being given the same reference numerals. Specifically, shown is a twine tensioner arm 252 comprising a spring metal rod including an elongate straight section 254 joined to and extending rearwardly from one end of a coiled section 256 having a second end joined to a short rearwardly extending section 258 terminating in a hook or eye 260 received about a mounting bolt 262 projecting upwardly through the channel member 112 and receiving a nut 264 threaded tightly against a washer 266 which bears on the eye 260. Another eye 268 is formed at the rear end of the straight section 254 of the tensioner arm 252 and securely grips a generally cylindrical twine guide 270. The section 254 of the tensioner arm 252 extends through the vertical slot 173 provided the vertical plate 146 and the upper end 195 of the slot serves as an up-stop against which the elongate arm section 254 is biased by the coil spring section 256. Thus, by constructing the tensioner arm as a spring metal rod, no additional spring is required to bias the arm to its upper extreme position.

Like the previously described tensioner arms 172, the position of the tensioner arm 252 is sensed by the associated rotary potentiometer 210, but because the tensioner arm 235 is of a rod construction, the tension arm follower 228 associated with the potentiometer is replaced by an L-shaped arm follower 272 that differs from the follower 228 in that the longitudinal leg extends rearward instead of forward and the transverse leg is forked so as to define a rightward opening slot 274 that receives the elongate arm section 254. Thus, like the previously described arm 172, a strand of twine extending rearwardly from an associated one of the twine tensioners or grippers 104 will be received in the twine guide 270 at the rear end of the arm section 254 and will be tensioned so as to cause the tensioning arm section 254 to be deflected downwardly into contact with the down-stop defined by one or the other of the above-described tubes 196R and 196L, with the associated potentiometer 210 sensing the movement of arm section 254 as it moves between the up- and down-stops and sending a signal to the controller 232 which corresponds to the position the arm section 254 occupies at any given time.

Having described the preferred embodiments, it will become apparent that various modifications can be made without departing from the scope of the invention as defined in the accompanying claims.

The invention claimed is:

1. A combination of a twine tensioner arm and arm position sensor arrangement comprising: said twine tensioner arm having front and rear ends and being mounted to a frame at a front end region establishing a connection permitting said tensioner arm to be moved between upper and lower extreme positions; said tensioner arm being biased to said upper extreme position and having a twine guide at its rear end for being engaged by a twine strand, which, when tensioned during bale formation, moves said tensioner arm toward said lower extreme position; said arm position sensor arrangement including a rotary potentiometer having a rotatable sensing shaft, a follower arm having a first end coupled to said rotatable sensing shaft and having a separate end located in a path of movement of the twine tensioner arm for being engaged by, and moved together with, the tensioner arm as it moves between said upper and lower extreme positions, with the potentiometer generating an electrical signal representative of the position of the tensioner arm at any given time.

2. The combination, as defined in claim 1, wherein said twine tensioner arm comprises a rigid arm mounted for pivoting about an axis in substantial axial alignment with the sensor shaft.

3. The combination, as defined in claim 2, wherein said follower arm is generally L-shaped with a first leg extending parallel to said axis and being received in an opening provided in the tensioner arm and with a second leg extending perpendicular to said axis and being fixed on said sensing shaft.

4. The combination, as defined in claim 3, wherein said tensioner arm extends forwardly beyond said axis and said opening is a slot formed in a front end of the tensioner arm.

5. The combination, as defined in claim 1, wherein said tensioner arm comprises a cantilever-mounted, elongate spring member; and said follower arm including first and second legs joined to each other to form an L-shape; with the first leg extending parallel to said axis, being forked and straddling said spring member; and with the second leg being fixed to said sensing shaft for imparting rotation to said sensing shaft in response to vertical deflection of said tensioner arm.

6. The combination, as defined in claim 5, wherein said spring member comprises a spring metal rod including an elongate section joined to one end of a coil section, with said coil section having a second end joined to a short section fixed to said frame.

7. In a large square baler having a fore-and-aft extending baling chamber; a tying system including a plurality of tying arrangements spaced evenly transversely across a top wall of the baling chamber and being provided for respectively tying a plurality of loops of twine strands about a bale formed in the baling chamber, each tying arrangement including a twine tensioner arm mounted for moving vertically between upper and lower extreme positions and being biased for resisting movement toward said lower extreme position, and a plurality of mistie sensing arrangements being provided for respectively sensing a mistie related to each of said plurality of loops, the improvement comprising: each said mistie sensing arrangement including a potentiometer having a rotatable sensing shaft; and a follower arm being coupled between said sensor shaft and an associated one of said tensioner arms for translating movement of said associated one of the tensioner arms to said sensor shaft which rotates and causes said potentiometer to generate a signal representing the position of said associated one of the tensioner arms at any given time during forming and tying said plurality of loops of twine strands about a bale in the baling chamber.

8. The large square baler, as defined in claim 7, wherein each said tensioner arm is a rigid arm mounted for pivoting about a horizontal, transverse axis;
and the sensing shaft of each potentiometer being axially aligned with said axis.

9. The large square baler, as defined in claim 8, wherein the follower arm of each mistie sensing arrangement includes first and second legs joined to each other to form an L-shape, with the first leg extending parallel to said axis and being received in an opening provided in the associated tensioner arm and with the second leg being fixed on the sensing shaft.

10. The large square baler, as defined in claim 9, wherein each tensioner arm has a forward end spaced forwardly of said axis and said opening being a notch located in said forward end.

11. The large square baler, as defined in claim 7, wherein each tensioner arm comprises a cantilever-mounted, elongate spring member.

12. The large square baler, as defined in claim 11, wherein said elongate spring member is defined by a spring metal rod including a central coil torsion spring section having opposite first and second ends respectively joined to an elongate, fore-and-aft extending arm section and a short anchor section, with the arm section having a twine guide formed at a free end thereof, and with said anchor section defining a loop received about, and held fast by, a mounting bolt, and with said coil section, when unloaded, holding the arm section in said extreme upper position.

13. The large square baler, as defined in claim 12, wherein each sensing shaft is disposed along an axis passing centrally through the coil torsion spring section of the spring member and is connected to the arm section of the spring member by said arm follower so as to measure the angular deflection of the arm section from said extreme upper position.

14. The large square baler, as defined in claim 13, wherein said arm follower is defined by an L-shaped strap, with one leg of the L extending perpendicular to the arm section and provided with a notch receiving the arm section.

15. In combination with a large square baler having a tying arrangement for securing opposite ends of a plurality of sets of upper and lower twine strands together with respective knots to respectively form a plurality of loops of twine about crop bales produced in a baling chamber of the baler, each tying arrangement further including:
a plurality of shiftable, upwardly biased tensioner arms respectively engaged with a plurality of upper twine strands of said plurality of sets of upper and lower twine strands for taking up slack in said plurality of upper strands,
a plurality of knotter assemblies for respectively attaching together the set of upper and lower twine strands of said plurality of loops,
a needle arrangement including a plurality of needles for bringing together respective ends of said plurality of sets of upper and lower twine strands into juxtaposition for being respectively attached together said plurality of knotter assemblies, the tying mechanism cycling through a tying cycle during which the plurality of tensioner arms shift between first and second positions, the arms normally shifting from the first to the second position immediately after the knotter assemblies attach together the opposite ends of the sets of upper and lower twine strands and subsequently shifting from the second to the first position,
an electronic control system for monitoring the operation of the tying arrangement comprising:
an electrically responsive tensioner arm position sensor being associated with each twine tensioner arm and being operable for sensing the position of the associated tensioner arm throughout its movement between the first and second positions and for generating an electrical arm position signal corresponding to the associated tensioner arm position;
an electronic controller;
each tensioner arm position sensor being coupled for sending its electrical arm position signal to the electronic controller;
a display being coupled to the electronic controller, with the electronic controller acting in response to said electrical arm position signals to generate respective display control signals for causing said display to show the sensed positions of each of said tensioner arms;
said electronic controller including logic software for determining anomalies in the sensed positions of the tensioner arms and sending warning signals to said display for causing at least one of an audible or a visual signal element to be energized to apprise an operator of any such anomalies, with at least one of the anomalies being at least one tensioner arm being located at a position other than one of said first and second positions when a majority of the tensioner arms is at such one of said first and second positions.

16. The large square baler, as defined in claim 15, wherein each electrically responsive twine arm position sensor is an electronic rotary potentiometer.

17. The large square baler, as defined in claim 15, wherein said logic software is operable for sending out a warning signal to said display for energizing a check tension alarm when the anomaly is that one of the tensioner arms is one of higher than or lower than the remainder of the tensioner arms when the plurality of tensioner arms are moving from said second to said first position.

18. The large square baler, as defined in claim 17, wherein, in response to one of said tensioner arms remaining in said first position immediately after a knot is tied forming a loop about the bale formed in the baling chamber, said logic software is operable for sending out a warning signal to said display for energizing a detect hung knot message.

19. The large square baler, as defined in claim 18, wherein said logic software, in addition to effecting energization of the hung knot message further acts to energize at least one of a check knife arm gap or check knife arm cam wear message.

20. The large square baler, as defined in claim 15, wherein said logic software is operable, in response to said twine tensioner arm sensors indicating that one tensioner arm is lagging the others in moving from said second to said first position, for sending out an instruction signal for energizing the display so as to show a message directing the operator to check if the tension established by the associated twine tensioner mechanism is too low or to check to see if the lagging tensioner arm is obstructed.

* * * * *